(12) United States Patent
Ramalho et al.

(10) Patent No.: US 8,929,263 B2
(45) Date of Patent: *Jan. 6, 2015

(54) ECHO MITIGATION IN THE PRESENCE OF VARIABLE DELAYS DUE TO ADAPTIVE JITTER BUFFERS

(71) Applicant: Cisco Technology, Inc., San Jose, CA (US)

(72) Inventors: Michael A. Ramalho, Sarasota, FL (US); Gary Skrabutenas, Palo Alto, CA (US); Jim Frauenthal, Colts Neck, NJ (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/905,640

(22) Filed: May 30, 2013

(65) Prior Publication Data

US 2013/0258909 A1    Oct. 3, 2013

Related U.S. Application Data

(63) Continuation of application No. 12/712,648, filed on Feb. 25, 2010, now Pat. No. 8,462,675.

(51) Int. Cl.
| H04B 3/20 | (2006.01) |
| H04M 3/00 | (2006.01) |
| H04M 9/08 | (2006.01) |
| H04B 3/23 | (2006.01) |

(52) U.S. Cl.
CPC .............. *H04M 3/002* (2013.01); *H04M 9/082* (2013.01); *H04B 3/23* (2013.01)
USPC ......................................................... 370/286

(58) Field of Classification Search
USPC .................. 370/291, 252, 290; 375/342, 343; 379/406.08, 406.01, 406.05; 381/318, 381/83, 93, 317; 455/67.1; 348/611; 704/E21.007, 233; 714/718
See application file for complete search history.

(56) References Cited

U.S. PATENT DOCUMENTS

| 7,304,962 | B1 * | 12/2007 | Kirla et al. ..................... 370/289 |
| 7,359,324 | B1 * | 4/2008 | Ouellette et al. .............. 370/230 |
| 8,041,027 | B2 * | 10/2011 | Wang ....................... 379/406.03 |
| 8,462,675 | B2 * | 6/2013 | Skrabutenas et al. ......... 370/286 |
| 2002/0181414 | A1 * | 12/2002 | Lai ................................ 370/286 |
| 2009/0202063 | A1 * | 8/2009 | Frauenthal et al. ...... 379/406.16 |

* cited by examiner

*Primary Examiner* — Phuongchau Ba Nguyen
(74) *Attorney, Agent, or Firm* — Tucker Ellis LLP

(57) ABSTRACT

In an example embodiment, a control connection is introduced between an adaptive jitter buffer (AJB) and an adaptive bulk delay (ABD) buffer of an echo canceller (ECAN) in an Internet Protocol (IP) conference bridge. The control connection allows the AJB to control the amount of delay inserted by the ABD in the ECAN convolution processor (CP) signal path. The adjustment in ABD delay restores the time alignment of the ECAN internal echo estimate and offsets variations in echo tail delay introduced by network induced AJB delay changes. Time-invariance is preserved in the echo tail path.

20 Claims, 5 Drawing Sheets

ECHO MITIGATION IN THE PRESENCE OF VARIABLE DELAYS DUE TO ADAPTIVE JITTER BUFFERS

CROSS REFERENCE TO RELATED APPLICATIONS

This application is a continuation of U.S. patent application Ser. No. 12/712,648, filed Feb. 25, 2010.

TECHNICAL FIELD

The present disclosure relates generally to communications.

BACKGROUND

Modern voice conference bridge architectures frequently employ Internet Protocol (IP) packet-based methods for transporting voice between the endpoints of a conference call. While generally providing voice quality equivalent to traditional time-division multiplexed (TDM) transport, packet-based transmission is not immune to issues affecting voice quality such as line echo.

Line echo occurs in the context of a conference call when a discontinuity (echo return point) exists somewhere in the transmission path of a bridge call leg. Because of the orientation of the Echo Canceller (ECAN), the call leg is in the echo tail in the echo control context. For a mixed conference speech signal in the bridge's outbound (ECAN receive) direction, it is at the discontinuity in the echo tail where a portion of the speech signal is reflected in the bridge's inbound (ECAN send) direction. IP based communication is inherently 4-wire (send and receive paths are separate) and generally thought to be free from echo sources. Nevertheless, there is a possibility that an electro-mechanical echo return point can exist in the switched telephone network side of an IP voice gateway or there can exist an acoustic coupling at the endpoint, for example between a handset microphone and speaker. Echoes from these discontinuities often escape control by the voice gateway network ECANs.

Jitter buffers are usually categorized as one of two modes: fixed or adaptive. For fixed mode the buffer depth is constant and set ideally to accommodate worst case network jitter. If jitter exceeds this depth, however, even briefly, data starvation may occur to the decoder. Starved of data, the decoder output may suffer loss of voice quality in the form of dropouts, clicks, pops or distorted speech. Adaptive mode attempts to resolve this issue by allowing the buffer depth to automatically adapt to current worst case network conditions. When network jitter is small, buffer size is also small; when network jitter is large, buffer size grows large enough (within maximum physical buffer limits) to accommodate it. Data starvation in the stream to the decoder is avoided, and voice quality is maintained.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
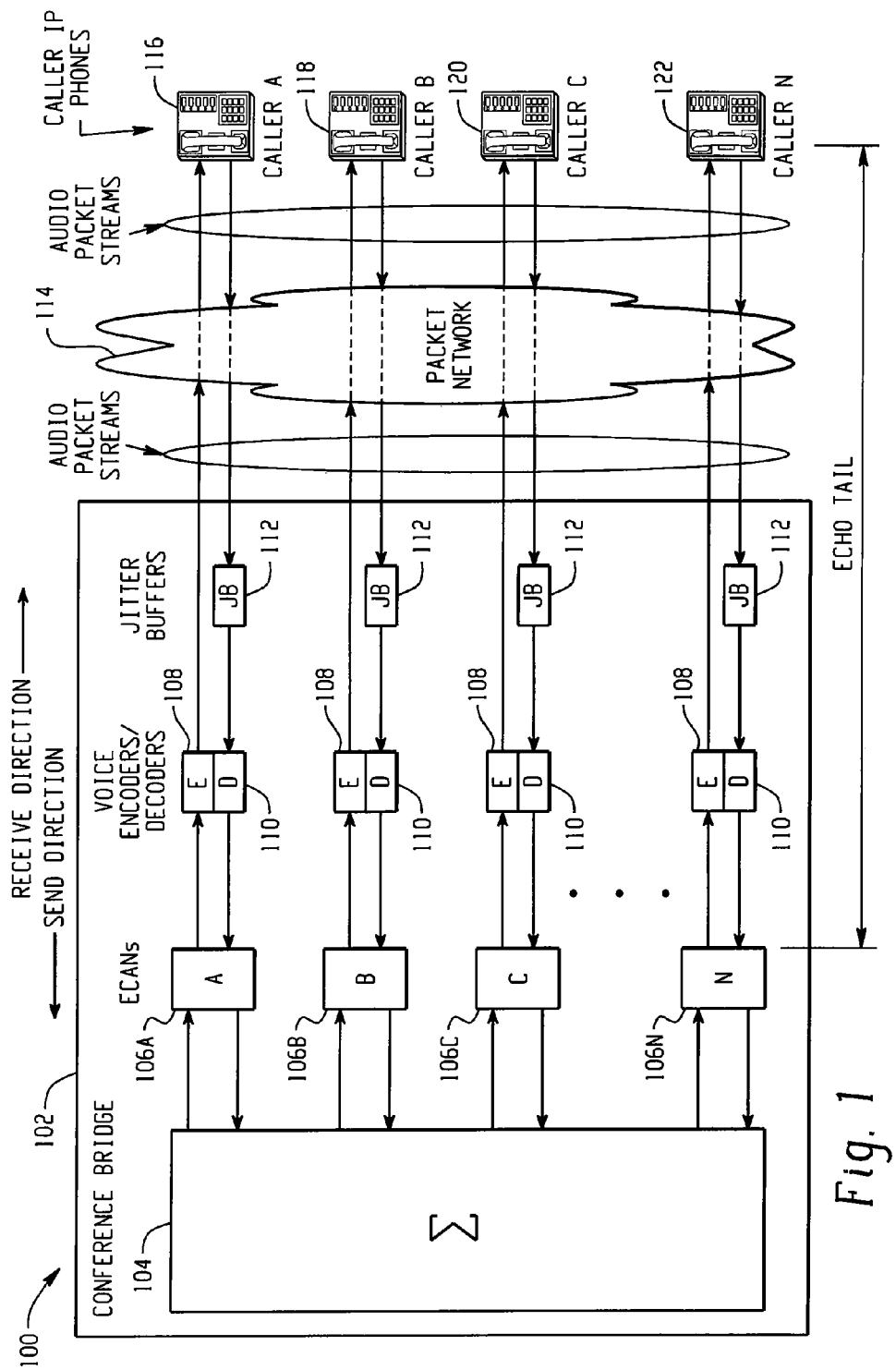
FIG. 1 is a block diagram illustrating an example of system employing a conference bridge comprising a plurality of Echo Canceller's configured in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a first interface configured to receive a first signal that is provided to an endpoint, a second interface configured to receive a second signal from the endpoint which passes through an adaptive jitter buffer, an adaptive bulk delay buffer configured to receive data representative of a length of the adaptive jitter buffer and to store data representative of a delay introduced by the adaptive jitter buffer, and a convolution processor that is operable to estimate an echo of a first signal present in a second signal that is delayed by an echo delay. The echo delay comprises an echo tail delay minus a bulk delay based on the data representative of the delay introduced by the adaptive jitter buffer.

In accordance with an example embodiment, there is disclosed herein an apparatus, comprising a mixer configured to send and receive signals to a plurality of callers associated with a conference call, and at least one call leg to at least one of the plurality of callers that comprises an echo canceller configured to receive a signal for the at least of the plurality callers, the echo canceller forwarding the received signal to a voice encoder, the voice encoder forwarding an encoded signal to the at least one of the plurality of callers. The at least one call leg to the at least one of the plurality of callers further comprises an adaptive jitter buffer configured receive a sent signal sent from the at least one of the plurality of callers, the adaptive jitter buffer is further configured to forward the sent signal to a voice decoder, the voice decoder is configured to forward a decoded, sent signal to the echo canceller, and the echo canceller is configured to forward the decoded, sent signal to the mixer. The echo canceller is further configured to estimate an echo of the received signal present in the decoded, sent signal and a delay of the echo signal. The echo canceller is further configured to receive a signal from the adaptive jitter buffer comprising data representative of a length of the adaptive jitter buffer. The echo canceller is configured to estimate the delay of the echo signal based on the length of the adaptive jitter buffer.

In accordance with an example embodiment, there is disclosed herein a method comprising generating an initial estimate of echo delay. The initial estimate of echo delay is adjusted responsive to initializing a call. Data representative of a change in a length of an adaptive jitter buffer is received during the call. The estimate of echo delay is updated based on the change in the length of the adaptive jitter buffer.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, described herein a system comprising a voice conference bridge capable of supporting a number of simultaneous users. For the purpose of this description there will be "n" participants in the conference, where n is any physically realizable number. The bridge allows one or more of the participants (potentially up to all "n", though most conference bridges limit the number of simultaneous speakers included in the mix) to talk at any instant and all "n" to hear. The two directions of transmission are fully separated from one another everywhere except within the signal mixer in the bridge and at the telephone endpoints where the callers are located. FIG. 1 is a block diagram illustrating an example of system 100 employing a conference bridge 102 comprising a plurality of Echo Cancellers 106 configured in accordance with an example embodiment. In the example illustrated in FIG. 1, there are a total of "n" active calls that are bridged together by Conference Bridge 102. To keep the description as simple as possible, each call is assumed to support a single user (though the system described operates identically if one or more of the endpoints support several users participating by means a speakerphone). In an example embodiment, conference bridge 102, or some of the components of conference bridge 102, such as ECANs 106, voice encoders 108, voice decoders 110, jitter buffers 112, are implemented in logic. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, a digital signal processor (DSP), or combinational logic embodied in hardware. For example, logic may be embodied as software stored on a non-transitory, tangible medium which performs a described function when executed by a processor. Logic may suitably comprise one or more modules configured to perform one or more functions.

Conference bridge 102 comprises a mixer 104 that mixes the signals from callers 116, 118, 120, 122 attending a conference call. For example, mixer 104 would receive signals (such as voice data) from caller A 116, caller B 118, caller C 120 . . . caller n 122. Mixer 104 would provide each caller with the signals from some or all the other callers but not from itself. For example, caller A 116 would receive signals (such as voice data) from caller B 118, caller C 120, . . . caller N 122.

Signals from Mixer 104 are routed through an Echo Canceller (ECAN) 106 that is associated with each caller. Received signals (from the caller's perspective) are routed from the mixer through an ECAN 106, voice encoder 108 and routed across network 114 to the appropriate caller. Network 114 may suitably comprise a packet switched network carrying voice over Internet Protocol (VoIP) traffic, a public switched telephone network (PSTN), a data network, a circuit switched network, packet switched network, or a combination thereof.

Signals (e.g. packets) from a caller (e.g. callers 116, 118, 120, 122, which are referred to herein as "sent signals" because these signals are sent from the caller's perspective) are routed across packet network 114 to an adaptive jitter buffer (AJB) 112. From adaptive jitter buffer 112 the signal is routed through a decoder 110, an ECAN 106 to mixer 104.

In this example, each caller 116, 118, 120, 122 has an ECAN 106 that is associated with conference bridge 102. Note that each ECAN 106 is oriented so that it cancels any echo that is reflected from callers 116, 118, 120, 122. In standard echo canceller parlance, the ECAN tail is facing the callers. In the simplest case, for example n=2, so for example the only callers in a call are Caller A 116 and Caller B 118. When caller A 116 speaks and Caller B 118 is silent, if Caller A 116 hears talker echo (the echo of what A is saying) the echo results from the circuitry near caller B 118; the echo from this circuitry is intended to be controlled by ECAN 106B in FIG. 1. More generally, if there are n>2 callers and again only caller A 116 speaks, any echo heard by caller A 116 could come from the circuitry associated with any of or some combination of the circuitry of the other n−1 callers. Thus, the talker echo of A should be controlled by ECAN 106B, ECAN 106C, . . . and ECAN 106N.

An aspect of an example embodiment mitigates ECAN instability due to time varying delays introduced by adaptive jitter buffers in the bridge leg echo tail. This is accomplished by allowing the Adaptive Jitter Buffer (AJB) in the conference bridge to control, at any instant of time, the amount of bulk delay inserted in the ECAN Convolution Processor (CP) signal path to match the current AJB delay. This bulk delay offsets the AJB delay thus restoring time-invariance. A control connection between the adaptive jitter buffer (AJB) and the ECAN adaptive bulk delay (ABD) buffer is introduced to enable this function.

Figure 2:
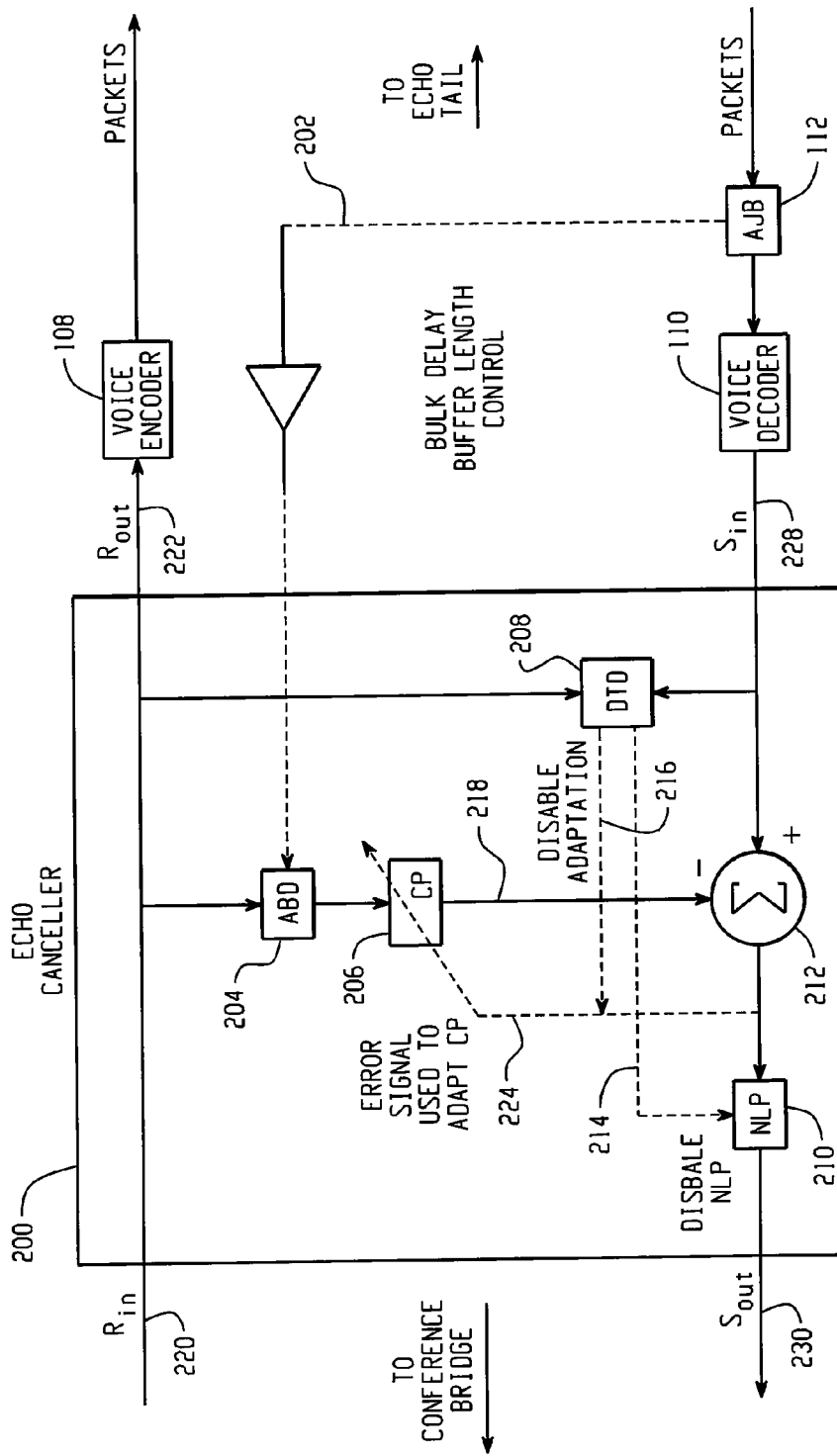
FIG. 2 is a block diagram illustrating an example of an echo canceller.

Referring to FIG. 2, within continued reference to FIG. 1, there is illustrated an example of echo canceller (ECAN) 200 configured in accordance with an example embodiment. ECAN 200 is suitable to implement any or all of ECAN 106A, ECAN 106B, ECAN 106C, . . ., ECAN 106N in FIG. 1. In particular embodiments, ECAN 200 is implemented in logic. For example ECAN 200 may be implemented in software, which performs the described functionality when executed by a processor such as a microprocessor. For the purpose of describing the operation of an ECAN, the description will describe the functionality of ECAN 106A in FIG. 1; however, those skilled in the art should readily appreciate that the example embodiments described herein can be applied to any ECAN such as ECANs 106B, 106C, . . . , 106N. In this example, the purpose of ECAN A is to cancel echo of the signal coming out of the bridge (mixer 104) and echoing back from Caller A 116. The two sides of ECAN 106 (for this example ECAN 106A) in the receive direction for Caller A 106 are referred to as Rin 220 and Rout 222. Any echo that is reflected back from Caller A 106 enters ECAN 106 in the send direction at Sin 228 and any residual echo exits at Sout 230.

Convolution Processor CP 206 uses the signal entering ECAN 200 at Rin 220 and the signal exiting the Summation Block 212 and creates an estimate of the echo impulse as a function of time (typically called the H-register image). This impulse response is used by CP 206 to create an estimate of the echo signal used to eliminate the echo. In an example embodiment, CP 206 estimates the echo delay based on a sum of the jitter buffer delay, packetization delays, and algorithmic delays. Summation block 212 subtracts the estimate of the echo signal, provided on control path 218, from the signal at Sin 228. The signal at the output of the summation block is typically called the "error signal" because if Caller A 106 is not speaking and the echo path impulse response is linear and time invariant (and the echo is within the range the CP 206 can accommodate), this signal is zero if the impulse response estimate is perfect. When the impulse response estimate is time aligned with the echo signal resulting in a minimal error signal, the ECAN is said to be converged. (This is equivalent to saying that the H-register estimate is not changing.) If the ECAN is not yet converged (also called "diverged"), the signal at this point is representative of the error in approximating the echo path and is used to update the CP 206 toward a better convergence estimate. The error signal is provided to CP 206 on control path 224.

In particular embodiments, the ECAN 106 also contains a double-talk detection (DTD) algorithm 208. If DTD 208 concludes that Caller A 106A is silent, the H-register will seek to improve its estimate of the echo and Non-Linear Processor (NLP) 210 will be activated to attenuate any residual echo that might be returned back toward the conference bridge (for example mixer 104 in FIG. 1). In this example, control path 216 from DTD 208 signals CP 206 to disable adaptation and control path 214 from DTD 208 to NLP 210 signals NLP 210 to disable non-linear processing while double-talk is detected.

In IP based voice communications and conferencing, network jitter (variable packet arrival times) may cause voice quality issues. These issues depend upon the severity of the jitter and range from merely annoying (occasional clicks) to virtually unintelligible (garbled or robotic) voice. IP voice communications equipment including conference bridges commonly employ jitter (also called "play-out delay") buffers to remove the effects of network jitter. These buffers receive voice packets whose arrival times are affected by network jitter, store the packets, and then play the packets out to the payload decoder at a constant rate. This helps maintain voice quality because the play-out rate to the decoder remains constant and prevents payload data starvation. See FIG. 1 for an example of a jitter buffer in the context of the IP conferencing system architecture.

Jitter buffers are usually categorized as one of two modes: fixed or adaptive. For fixed mode the buffer depth is constant and set ideally to accommodate worst case network jitter. However, if jitter exceeds this depth, even briefly, data starvation may occur to the decoder. Starved of data, the decoder output may suffer loss of voice quality in the form of dropouts, clicks, pops or distorted speech. Adaptive mode attempts to resolve this issue by allowing the buffer depth to automatically adapt to current worst case network conditions. When network jitter is small, buffer size is also small; when network jitter is large, buffer size grows large enough (within maximum physical buffer limits) to accommodate it. Data starvation in the stream to the decoder 110 is avoided, and voice quality is maintained.

Jitter buffers insert delay in the echo tail round trip path from the view of a conference bridge ECAN (e.g., ECAN 106A) facing the endpoint (for example Caller A 116). For fixed length jitter buffers, pure, time-invariant delay is inserted in the echo tail. ECANs 106 can operate without major problems in this situation. In this case the ECAN H-register echo image can be easily repositioned to restore time-alignment with the echo signal by inserting a matching fixed bulk delay in the ECAN CP 206 control path. The addition of fixed bulk delay effectively increases the length of the echo talk by the amount of the bulk delay insertion. Adaptive jitter buffers (AJB), such as AJB 112, on the other hand, insert delays in the echo tail that can be difficult for an ECAN to offset due to their variability and unpredictability. In the presence of this time varying echo tail delay, ECANs may have difficulty achieving or maintaining time alignment with the echo signal. In these situations when delays change after convergence, ECANs may diverge for a time and there may be a noticeable echo. The echo remains audible as long as delays continue to change and the ECAN remains diverged.

In accordance with an example embodiment, control path 202 is employed that enables an AJB 112 to communicate, at any instant of time, the amount of bulk delay inserted in the ECAN CP 206 signal path to match the current AJB delay. This bulk delay offsets the AJB 112 delay thus restoring time-invariance. Control path 202 couples adaptive jitter buffer (AJB) 112 with and an ECAN adaptive bulk delay (ABD) buffer 204. The data sent from AJB 112 to ABD buffer 204 can include, but is not limited to current buffer depth (in units of number of packets, number of bytes, and/or amount of delay introduce by adaptive jitter buffer, for example in milliseconds), and/or a timestamp. AJB 112 may either continuously or periodically send data to ABD buffer 204. Changing the delay in ABD 204 to correspond to changes in AJB 112 restores the echo tail delay so that any echo signal lies within the tail coverage of CP 206 and the echo tail delay appears constant to CP 206 (which will be explained in further detail with reference to FIGS. 3 and 4 infra).

Figure 3:
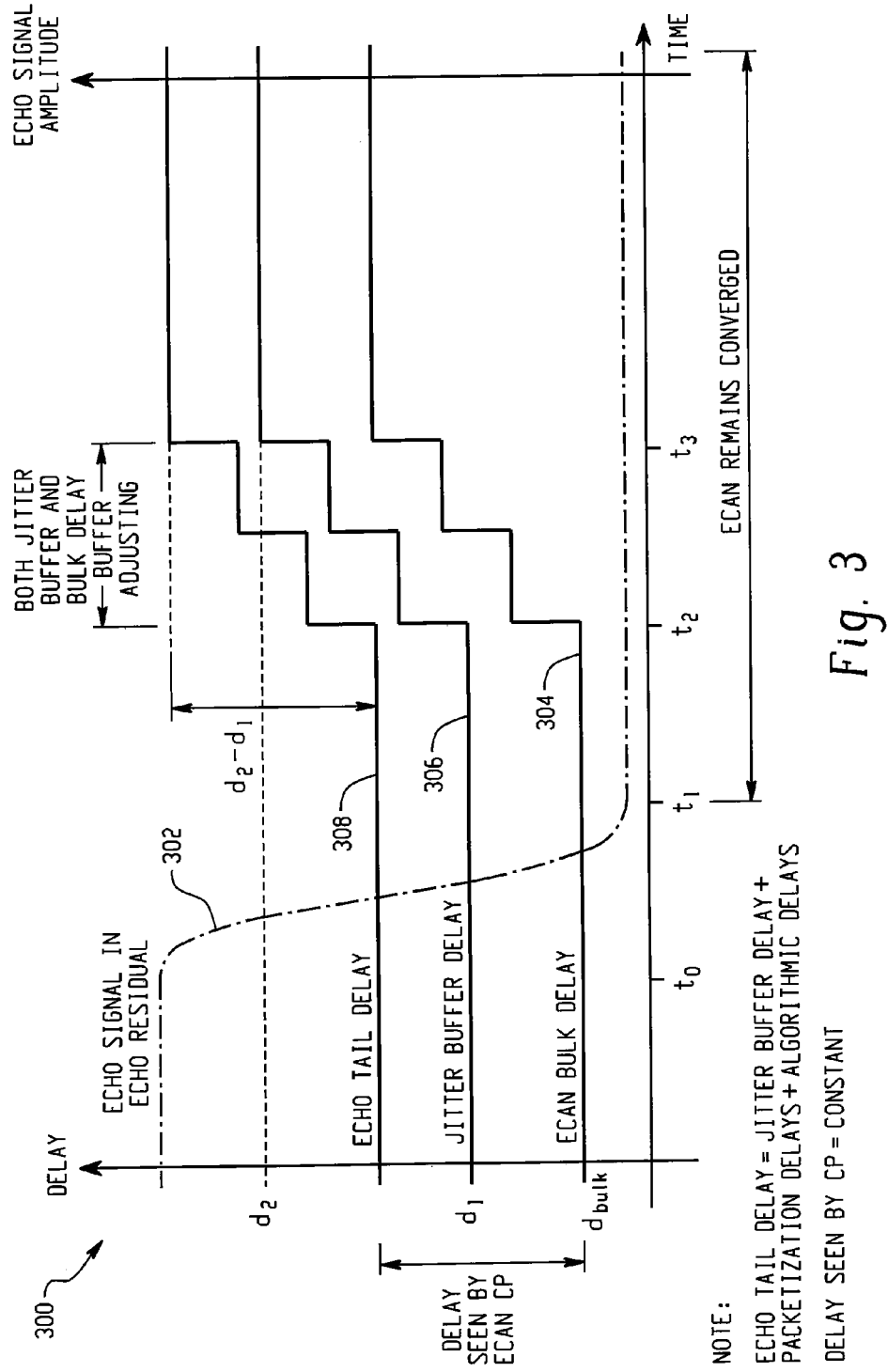
FIG. 3 is a signal diagram illustrating an example of echo canceller behavior during changes in tail delay due to changes in a jitter buffer with adaptive bulk delay control.

Referring now to FIG. 3, within continued reference to FIG. 2, there is illustrated a signal diagram 300, illustrating ECAN behavior during changes in tail delays due to changing network jitter with adaptive bulk delay control. In this example, the echo signal present in the echo residual signal (for example Sout 230 in FIG. 2) is represented by 302, the ECAN bulk delay is represented by 304, jitter buffer delay by 306, and echo delay by 308.

Signal diagram 300 starts from initial conditions immediately before the arrival of a call on a bridge port. AJB 112 depth has already adapted to value $d_1$ to accommodate current network jitter conditions. The ECAN internal components are initialized, and its internal bulk delay (represented by 304) is configured with no delay or a fixed delay value. Once the call connects to the bridge at time $t_0$, the ECAN CP (for example CP 206 in FIG. 2) adapts and generates the echo estimate signal used to subtract the echo from the send side signal (Sin 228). Once the ECAN converges at time $t_1$, the echo residual contains a minimal amount of echo signal. At a later time, $t_2$, changes in network jitter force the AJB (for example AJB 112 in FIGS. 1 and 2) to change its depth from $d_1$ to $d_2$ (AJB depths typically adjust in steps equivalent to the size of a frame but other adjustments are possible). This also changes the echo tail delay that would be seen by CP 206 (AJB 112 depth may change gradually or quickly depending upon the specifics of the AJB adaptation algorithm; however, once AJB 112 logic decides to change its buffer depth at time $t_2$, it sends control data to the ABD buffer 204 through control path 202. This control data changes the ABD buffer 204 depth at time $t_2$ so it is synchronized to the depth change of AJB 112. This action changes the bulk delay (represented by 304) inserted by ABD buffer 204 in the CP 206 signal path to re-align the echo estimate to its original, pre-adaptation location. This keeps the difference between the echo tail delay and bulk delay constant (as shown by the difference between signals 308 and 304). The resulting delay seen by the CP (Delay seen by CP=Echo tail delay minus ECAN bulk delay) is constant. Thus CP 206 does not lose convergence and does not have to re-adapt to changes in AJB 112 depth.

Figure 4:
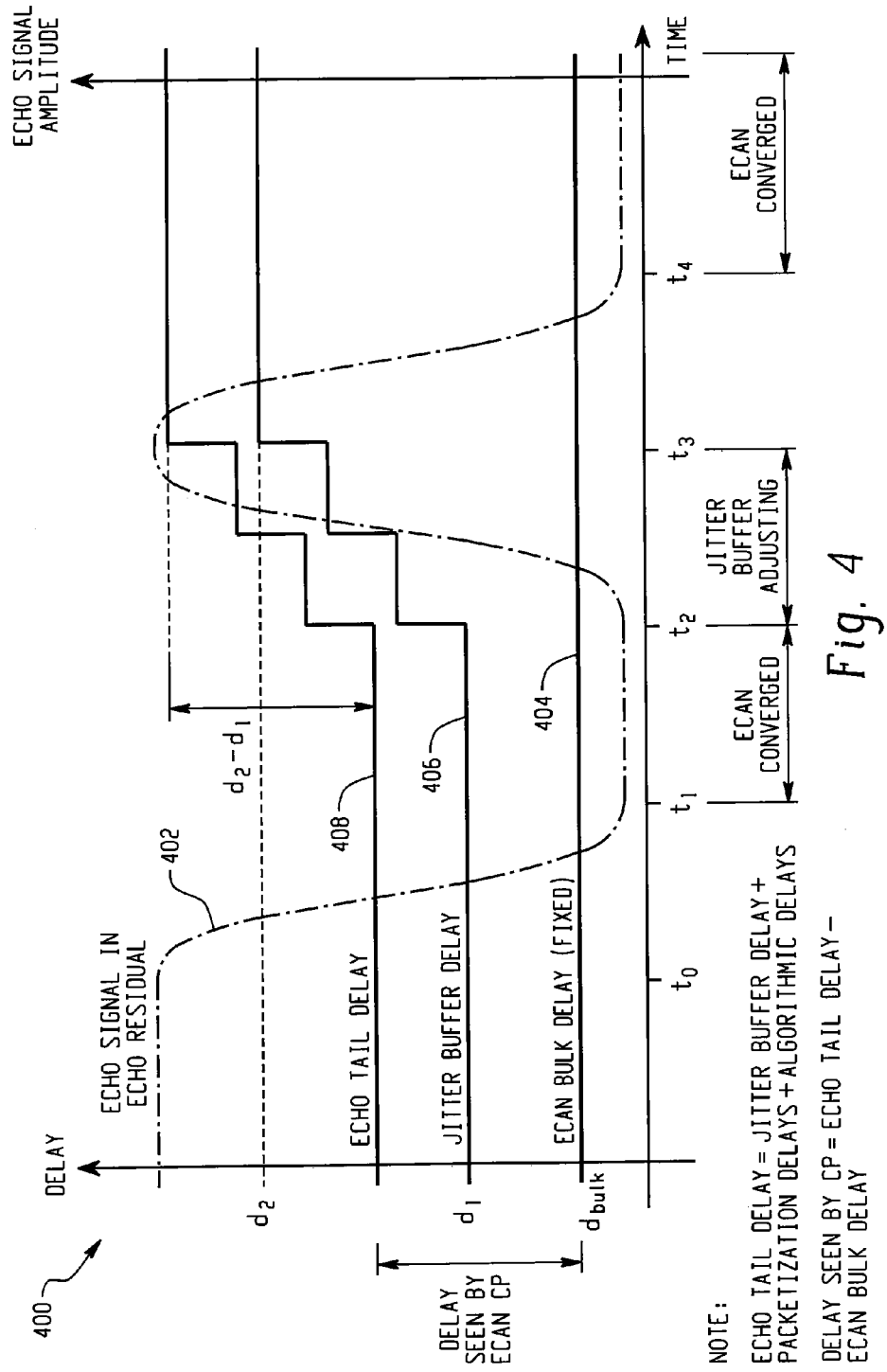
FIG. 4 is a signal diagram illustrating an example of echo canceller behavior during changes in tail delay due to changes in a jitter buffer with fixed or no bulk delay control.

FIG. 4 illustrates an example signal diagram 400 of ECAN behavior during changes in tail delays due to changes in network jitter with a constant (or no) bulk delay. In this example, the echo signal present in the echo residual signal (for example Sout 230 in FIG. 2) is represented by 402, the ECAN bulk delay is represented by 404, jitter buffer delay by 406, and echo delay by 408.

In this example, the AJB 112 depth has already adapted to value $d_1$ to accommodate current network jitter conditions. The ECAN internal components are initialized, and its internal bulk delay (represented by 404) is configured with no delay or a fixed delay value. Once the call connects to the bridge at time $t_o$, the ECAN CP 206 adapts and generates the echo estimate signal used to subtract the echo from the send side signal (Sin 228). Once the ECAN converges at time $t_1$, the echo residual 402 contains a minimal amount of echo signal. At a later time, $t_2$, changes in network jitter force the AJB 112 to change its depth from $d_1$ to $d_2$. This also changes the echo tail delay (Echo tail delay=jitter buffer delay+packetization delay+algorithmic delays) by the same amount $d_2$-$d_1$. AJB 112 depth may change gradually or quickly depending upon the specifics of the AJB 112 adaptation algorithm. The changing echo tail delay also changes the delay seen by the ECAN (Delay seen by CP=Echo tail delay minus ECAN bulk delay) because the ECAN bulk delay is fixed. This causes the CP to re-adapt at time $t_3$. The ECAN temporarily loses convergence, and potentially an audible echo signal returns to the echo residual (Sout 230). After a while, the ECAN reconverges, illustrated at time $t_4$, and the echo fades away. As can be seen from the foregoing, changing the bulk delay to adapt to changes to network jitter prevents the ECAN from temporarily losing convergence from $t_2$ to $t_4$.

Figure 5:
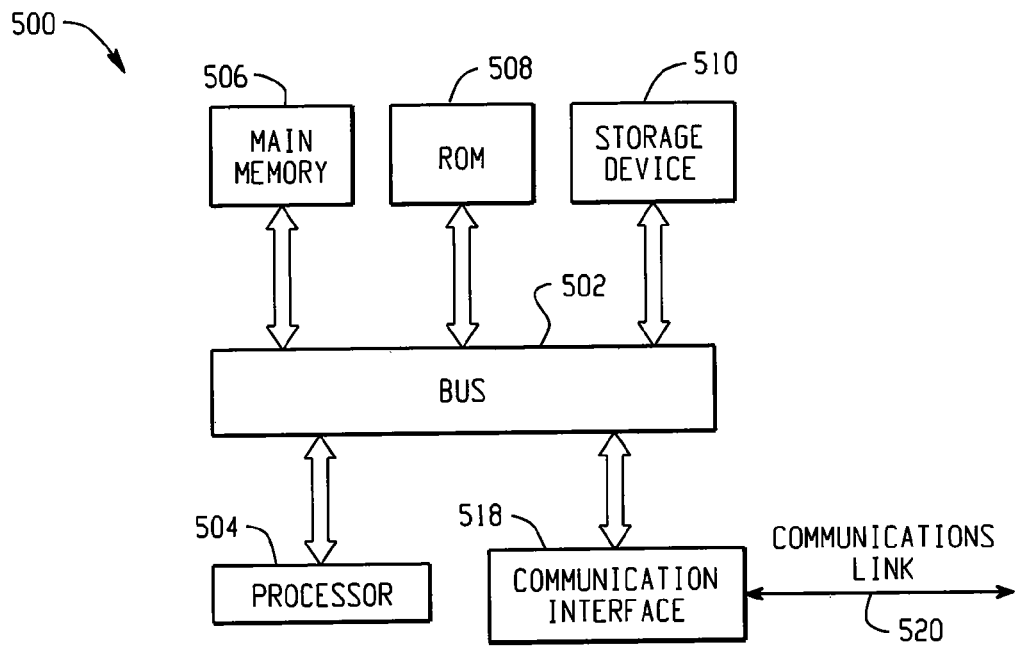
FIG. 5 is a computer system upon which an example embodiment may be implemented.

FIG. 5 is a computer system 500 upon which an example embodiment may be implemented. Computer system 500 is suitable for implementing conference bridge 102 or any of the components such as ECANs 106, encoders 108, decoders 110 jitter buffers 112, and/or any of the logic described herein. Implementing an example embodiment on a general purpose computer system 500 as described in the following paragraphs does not preclude similar implementations hosted on other computer architectures.

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the example embodiment is related to the use of computer system 500 for Echo Mitigation In the Presence of Variable Delays Due to Changes in Adaptive Jitter Buffers. According to an example embodiment, Echo Mitigation In the Presence of Variable Delays Due to Changes in Adaptive Jitter Buffers is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Transmission media include coaxial cables, copper wire and fiber optics, including the wires that comprise bus 502. Transmission media can also take the form of acoustic or light waves such as those generated during radio frequency (RF) and infrared (IR) data communications. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling computer system 500 to a communications link 520. For example, if computer system 500 is employed to implement one of ECANs 106 (FIG. 1), communication interface 518 may be coupled to an encoder 108 (FIG. 1) and/or decoder 110 (FIG. 1). As another example, if computer system is used to implement conference bridge 102, communication interface (or a multiplicity of communication interfaces) may be employed to couple conference bridge 102 to network 104 to facilitate communications with caller A 106, caller B 108, caller C 110, . . . , caller N 112.

For example, communication interface 518 may be a local area network (LAN) card to provide a data communication connection to a compatible LAN. As another example, communication interface 518 may be an integrated services digital network (ISDN) card or a modem to provide a data communication connection to a corresponding type of telephone line. Wireless links may also be implemented. In any such implementation, communication interface 518 sends and receives electrical, electromagnetic, or optical signals that carry digital data streams representing various types of information.

Figure 6:
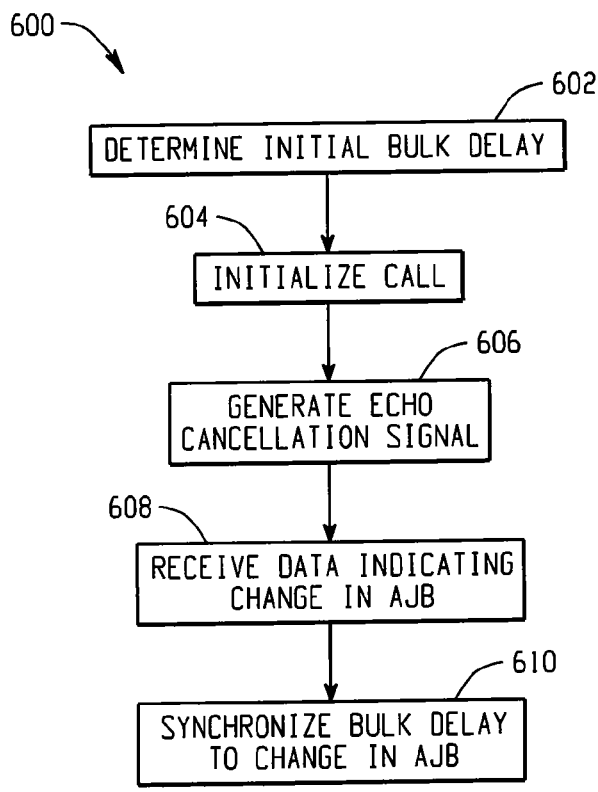
FIG. 6 is a methodology in accordance with an example embodiment.

In view of the foregoing structural and functional features described above, a methodology 600 in accordance with an example embodiment will be better appreciated with reference to FIG. 6. While, for purposes of simplicity of explanation, methodology 600 of FIG. 6 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement methodology 600 in accordance with an aspect of an example embodiment. Methodology 600 described herein is suitably adapted to be implemented in hardware, software, or a combination thereof. For example methodology 600 may be implemented by conference bridge 102 (FIG. 1), at least one of ECANs 106 (FIG. 1 and/or FIG. 2), and/or computer system 500 (FIG. 5).

At 602, before the arrival of a call on a bridge port, an adaptive jitter buffer (for example AJB 112 in FIGS. 1 and 2) is initialized. The adaptive jitter buffer may be initialized to a default length, or to a length based on current network conditions. The echo canceller (ECAN, for example ECAN 106 in FIG. 1 and/or ECAN 200 in FIG. 2) is configured to an initial condition, comprising an internal bulk delay. The internal bulk delay may be a fixed value, such as a default value, or zero (no delay).

At 604, a call is initialized. Once the call is connected, the echo canceller begins to adapt and generates an echo cancellation signal based on an estimate of echo present in a signal as represented by 606. Once the echo cancellation signal converges, the residual signal from the echo canceller contains a minimum amount of echo.

At a later time, represented by 608, the adaptive jitter buffers (AJB) changes its depth. This change may be caused by changes in network conditions and/or changes in jitter. The depth of the adaptive jitter buffer may change gradually or quickly, depending upon the adaptation algorithm employed by the adaptive jitter buffer. In an example embodiment, the change in the adaptive jitter buffer is in steps corresponding to the size of a frame, but other adjustments are possible. For example, the change may be N×size_frame where N is an integer. The adaptive jitter buffer communicates the change in the depth of the jitter buffer to the echo canceller.

At 610, in response to receiving data from the adaptive jitter buffer indicating the depth of the jitter buffer has changed, the bulk delay used in determining echo delay is synchronized to the change in the adaptive jitter buffer. For example, the echo tail delay may be determined as jitter buffer delay+packetization delays+algorithmic delays, where the delay observed by the convolution processor (for example CP 206 in FIG. 2) can be expressed as echo tail delay−ECAN bulk delay. By changing the ECAN bulk delay to maintain synchronization with the length of the adaptive jitter buffer, the delay seen by the convolution processor appears constant, thus the convolution processor does not lose convergence due to changes in the length of the adaptive jitter buffer.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. Logic encoded in a tangible, non-transitory computer readable medium for execution by a processor, and when executed operable to:
receive a first signal from a first interface;
receive a second signal from a second interface, the second signal comprising an echo of the first signal, the second signal passing through an adaptive jitter buffer;
generate an echo cancelation signal to eliminate the echo of the first signal;
determine an echo delay for the echo cancellation signal based on a bulk delay constant that comprises a jitter buffer delay from the adaptive jitter buffer;
obtain data representative of a change in a size of the adaptive jitter buffer;
adjust the bulk delay constant based on a change in the jitter buffer delay from the adaptive jitter buffer.

2. The logic set forth in claim 1, further operable to:
estimate an echo tail delay;
wherein logic adjusts the bulk delay constant in response to the change in the size of the adaptive jitter buffer so that the echo tail delay minus the bulk delay constant is a constant.

3. The logic set forth in claim 2, wherein the echo tail delay comprises a jitter buffer delay, a packetization delay and algorithmic delay.

4. The logic set forth in claim 1, wherein the first signal is a receive side signal path from a conference bridge mixer to an associated caller of a conference call; and
wherein the second side signal is a send side signal path from the associated caller to the conference bridge mixer of the conference call.

5. The logic set forth in claim 1, wherein the logic periodically receives data representative of the size of the adaptive jitter buffer from the adaptive jitter buffer.

6. The logic set forth in claim 1, wherein the logic continuously receives data representative of the size of the adaptive jitter buffer from the adaptive jitter buffer.

7. The logic set forth in claim 1, wherein the data representative of the size of the adaptive jitter buffer is based on a number of packets.

8. The logic set forth in claim 1, wherein the data representative of the size of the adaptive jitter buffer is based on a time delay.

9. The logic set forth in claim 1, wherein the data representative of the size of the adaptive jitter buffer is a timestamp.

10. The logic set forth in claim 1, wherein the echo cancellation signal is subtracted from the second signal.

11. A method, comprising:
receiving a first signal from a first interface;
receiving a second signal from a second interface, the second signal comprising an echo of the first signal, the second signal passing through an adaptive jitter buffer;
generating, by a processor, an echo cancelation signal to eliminate the echo of the first signal;
determining, by the processor, an echo delay for the echo cancellation signal based on a bulk delay constant that comprises a jitter buffer delay from the adaptive jitter buffer;
obtaining data representative of a change in a size of the adaptive jitter buffer;
adjusting, by the processor, the bulk delay constant based on a change in the jitter buffer delay from the adaptive jitter buffer.

12. The method set forth in claim 11, further comprising:
estimating, by the processor, an echo tail delay;
wherein the processor adjusts the bulk delay constant in response to the change in the size of the adaptive jitter buffer so that the echo tail delay minus the bulk delay constant is a constant.

13. The method set forth in claim 12, wherein the echo tail delay comprises a jitter buffer delay, a packetization delay and algorithmic delay.

14. The method set forth in claim 11, wherein the first signal is a receive side signal path from a conference bridge mixer to an associated caller of a conference call; and
wherein the second signal is a send side signal path from the associated caller to the conference bridge mixer of the conference call.

15. The method set forth in claim 11, wherein the processor periodically receives data representative of the size of the adaptive jitter buffer from the adaptive jitter buffer.

16. The method set forth in claim 11, wherein the processor continuously receives data representative of the size of the adaptive jitter buffer from the adaptive jitter buffer.

17. The method set forth in claim 11, wherein the data representative of the size of the adaptive jitter buffer is based on a number of packets.

18. The method set forth in claim 11, wherein the data representative of the size of the adaptive jitter buffer is based on a time delay.

19. The method set forth in claim 11, wherein the data representative of the size of the adaptive jitter buffer is a timestamp.

20. The method set forth in claim 11, wherein the processor subtracts the echo cancellation signal from the second signal.

* * * * *